(No Model.)
L. MUNDY.
FENDER FOR HORSE RAKES.
No. 378,103. Patented Feb. 21, 1888.
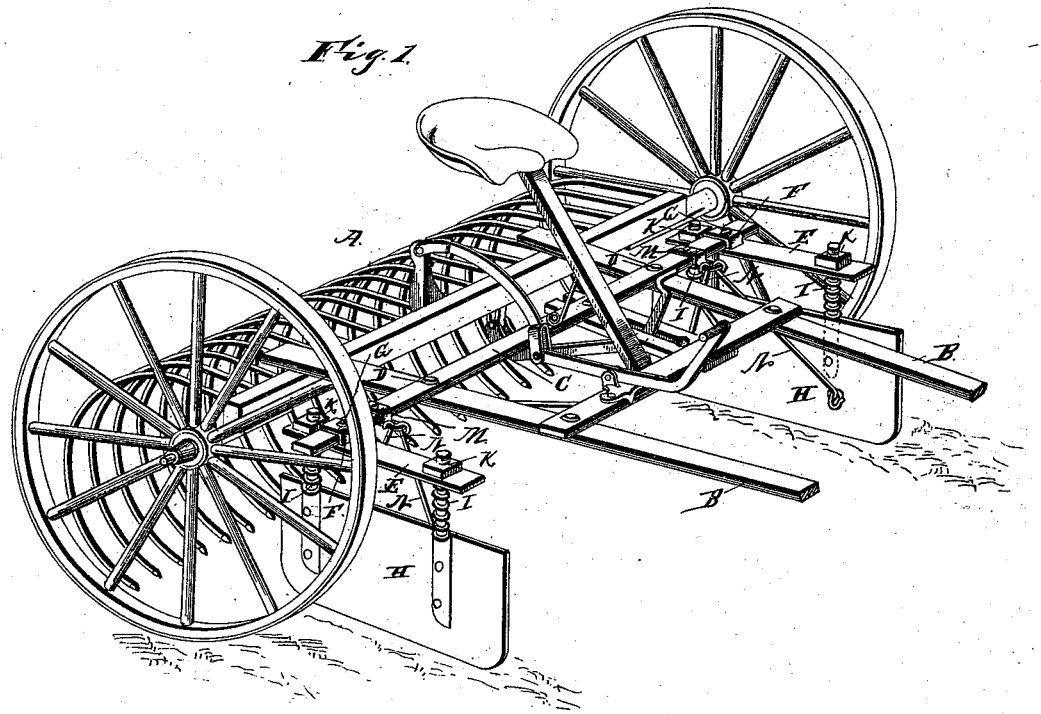
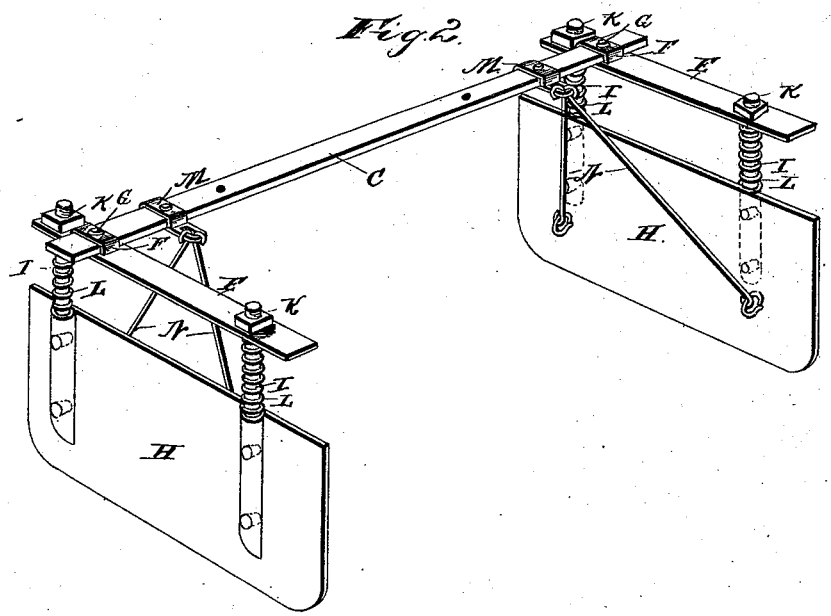
Witnesses
Geo. Thorpe.
J. W. Garner
Inventor,
Lebbeus Mundy,
by C. A. Snow & Co.
Attorneys

UNITED STATES PATENT OFFICE.

LEBBEUS MUNDY, OF MORGAN, KANSAS.

FENDER FOR HORSE-RAKES.

SPECIFICATION forming part of Letters Patent No. 378,103, dated February 21, 1888.

Application filed September 3, 1887. Serial No. 248,724. (No model.)

*To all whom it may concern:*

Be it known that I, LEBBEUS MUNDY, a citizen of the United States, residing at Morgan, in the county of Chase and State of Kansas, have invented a new and useful Improvement in Fender Attachments for Sulky Hay-Rakes, of which the following is a specification.

My invention relates to an improvement in fender attachments for sulky hay-rakes; and it consists in the peculiar construction and combination of the devices that will be more fully set forth hereinafter, and particularly pointed out in the claims.

In the accompanying drawings, Figure 1 is a perspective view of a sulky hay-rake provided with my improved fender attachment. Fig. 2 is a perspective view of my improved fender attachment, showing the same removed from the hay-rake.

A represents a sulky hay-rake, of the usual construction, provided with the thills or shafts B, the rear ends of which project rearward beyond the axle. To these thills, at a point slightly in front of the rake-head, is attached a cross-bar, C, by means of clamps or bolts D, whereby the said cross-bar may be readily detached from the thills when desired. The length of this cross-bar is equal to the length of the rake-head, and the ends thereof are nearly in contact with the inner sides of the supporting-wheels of the rake.

E represents a pair of straight bars, which are arranged transversely to and under the ends of the bars C and project forward therefrom, and are secured thereto by means of clips F and clamping-bolts G.

H represents a pair of fenders, which are preferably made of sheet or plate metal of suitable thickness, and have their lower corners rounded, as shown. To the outer sides of these fenders are secured vertical standards I, the upper ends of which are round and extend above the upper edges of the fenders, are passed through openings in the ends of the bars E, and are provided with adjusting-nuts K. Coiled springs L are placed upon the upper ends of these standards and bear between the lower sides of the bars E and the upper edges of the fenders, the said springs serving to normally hold the fenders downward nearly in contact with the ground. These fenders are arranged on the inner sides of the supporting-wheels, and in front of and in transverse line with the ends of the rake-head, and serve to close the ends of the rake, as will be readily understood.

The clips M encircle the bar C, and are bolted thereto at suitable distances from the ends of the bar, and brace-rods N extend from the said clips to the inner side of the fenders and are connected thereto, the said braces being to prevent the fenders from moving laterally.

The operation of my invention is as follows: When the machine is in motion, the fenders serve to prevent the hay from escaping from the ends or sides of the rake and becoming strewn along the field. In the event that either of the fenders should encounter an obstruction the springs bearing thereon will permit the fender to rise and pass over the obstruction without injury.

Hay-rakes which are not provided with fenders lose a considerable portion of the hay, which is blown from the ends or sides of the rake-head by the wind, this being especially true if the hay is short. My improved fender attachment prevents this loss of hay from the ends of the rake-head, and will be found of great utility and convenience to farmers.

I have tested this invention practically in the field, and find that it operates very successfully.

Having thus described my invention, I claim—

1. The combination, with a sulky hay-rake, of the cross-bar C, detachably secured to the thills of the rake, the bars E at the ends of the bar C, and the fenders depending from said bars E, substantially as described.

2. The combination, in a fender attachment for sulky hay-rakes, of the cross-bar C, the bars E, attached to the ends thereof, the fenders H, having the vertical standards secured to the bars E and vertically adjustable, the clips M on the bar C, and the rods N, pivotally connected to the said clips and to the fenders, substantially as described.

3. In a fender attachment for sulky hay-rakes, the combination of the cross-bar C, the bars E, attached to the ends thereof, the fenders having the vertical standards secured to the bars E and vertically movable therein, and the springs bearing down upon the fenders, for the purpose set forth, substantially as described.

4. The combination, in a fender attachment for sulky hay-rakes, of the cross-bar C, the bars E, attached to the ends thereof, the fenders having the vertical standards secured to the bars E and vertically movable therein, the springs bearing down upon the said fenders, and the brace-rods connecting the inner sides of the said fenders to the cross-bar, substantially as described.

In testimony that I claim the foregoing as my own I have hereto affixed my signature in presence of two witnesses.

LEBBEUS MUNDY.

Witnesses:
JNO. B. SHIPMAN,
JOHN V. SANDERS.